United States Patent
Shen et al.

(10) Patent No.: US 9,928,881 B1
(45) Date of Patent: Mar. 27, 2018

(54) DYNAMIC WRITE FIELD TEST FOR A PERPENDICULAR RECORDING HEAD

(71) Applicant: Seagate Technology LLC, Cupertino, CA (US)

(72) Inventors: Zhe Shen, Lakeville, MN (US); Zuxuan Lin, Maple Grove, MN (US); Lei Lu, Bloomington, MN (US); Jianhua Xue, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/711,790

(22) Filed: Sep. 21, 2017

(51) Int. Cl.
*G11B 5/09* (2006.01)
*G11B 20/10* (2006.01)
*G11B 27/36* (2006.01)
*G11B 5/455* (2006.01)
*G11B 5/012* (2006.01)
*G11B 5/00* (2006.01)
*G11B 5/55* (2006.01)

(52) U.S. Cl.
CPC ............. *G11B 27/36* (2013.01); *G11B 5/012* (2013.01); *G11B 5/455* (2013.01); *G11B 5/4555* (2013.01); *G11B 20/10009* (2013.01); *G11B 5/5552* (2013.01); *G11B 2005/0013* (2013.01)

(58) Field of Classification Search
CPC ........... G11B 5/012; G11B 27/36; G11B 5/02; G11B 2220/20; G11B 5/314; G11B 11/10554; G11B 11/1058; G11B 2005/0021; G11B 7/126; G11B 7/1267
USPC .......... 360/25, 31, 53, 59; 369/13.13, 13.33, 369/13.34, 47.5, 47.51, 53.1
See application file for complete search history.

(56) References Cited

U.S. PATENT DOCUMENTS

| | | | |
|---|---|---|---|
| 6,870,697 B2 | 3/2005 | Ikekame et al. | |
| 6,894,489 B2 * | 5/2005 | Makuuchi | G01R 33/1207 324/212 |
| 7,131,346 B1 | 11/2006 | Buttar et al. | |

OTHER PUBLICATIONS

Czoschke et al. "Real-time direct measurement of field rise time and dynamic instability of perpendicular writers", Applied Physics Letters 97, 242504, American Institute of Physics, dated Dec. 13, 2010, 4 pages.
Li et al. "Methods for characterizing magnetic footprints of perpendicular magnetic recording writer heads", Journal Application Physics 115, 17B733, 2014 AIP Publishing LLC, dated Nov. 19, 2013, 3 pages.

* cited by examiner

*Primary Examiner* — Nabil Hindi
(74) *Attorney, Agent, or Firm* — Westman, Champlin & Koehler, P.A.

(57) ABSTRACT

A method of testing a dynamic write field of a recording head includes preparing a test magnetic medium and recording a write signal on the test magnetic medium with the write signal being set at a first write parameter and a second write parameter. An average of multiple read-back signals of the recorded write signal are captured to determine an average amplitude of the read-back signals. The recording of the write signal on the test magnetic medium and the capturing of the average of multiple read-back signals of the recorded write signal are repeated to determine the average amplitude of the read-back signals by fixing the first write parameter of the write signal and changing the second write parameter of the write signal until the average amplitude of the read-back signals saturates.

20 Claims, 5 Drawing Sheets

DYNAMIC WRITE FIELD TEST FOR A PERPENDICULAR RECORDING HEAD

BACKGROUND

In perpendicular recording, magnetic media or magnetic discs are written to and read from by magnetic heads. Each head is moved in close proximity over a location on the magnetic media. A magnetic field may be generated in the magnetic head's write coils, causing the magnetic field to write data to or store information in the magnetic media. The magnetic field is generated by a write current which may be provided to the write coils as a series of current pulses. In addition, each head contains a read sensor for reading back the information stored on the magnetic media by the write current.

SUMMARY

A method of testing a dynamic write field of a recording head includes preparing a test magnetic medium and recording a write signal on the test magnetic medium with the write signal being set at a first write parameter or condition and a second write parameter or condition. An average of multiple read-back signals of the recorded write signal are captured to determine an average amplitude of the read-back signals. The average amplitude of the read-back signals is related to write current. The recording of the write signal on the test magnetic medium and the capturing of the average of multiple read-back signals of the recorded write signal are repeated to determine the average amplitude of the read-back signals by fixing the first write parameter or condition of the write signal and changing the second write parameter or condition of the write signal until the average amplitude of the read-back signals saturates.

Under one embodiment, the first write parameter or condition includes an amplitude of the write current and the second write parameter or condition includes a pulse width of the write signal. In this embodiment and when the method repeats, the amplitude of the write current remains fixed and the pulse width of the write signal changes or is swept until the average amplitude of the read-back signals saturate.

Under another embodiment, the first write parameter or condition includes a pulse width of the write signal and the second write parameter or condition includes an amplitude of the write current. In this embodiment and when the method repeats, the pulse width of the write signal remains fixed and the amplitude of the write current changes or is swept until the average amplitude of the read-back signals saturate.

The above summary is not intended to describe each disclosed embodiment or every implementation of the present disclosure. The figures and the detailed description below more particularly exemplify illustrative embodiments.

DETAILED DESCRIPTION OF ILLUSTRATIVE EMBODIMENTS

As recording data rates in hard disc drives (HDDs) approach and surpass 4 Gbits/s (250 ps), understanding the dynamic behavior of the write field in a recording head at high frequencies is important for designing and developing magnetic heads. In particular, determining how fast a writer design behaves is important. Writers with a write current ($I_w$) that has a fast or short rise time (RT), which is the amount of time it takes for a writer reach a maximum flux or to saturate, are indicative of having fast recording data rates.

Many different techniques for measuring or inferring perpendicular writer dynamics and rise time have been used. One example includes time-resolved scanning Kerr microscopy (TRSKM). However, most modern write transducers are shielded with ferromagnetic material spaced between 20 and 40 nm from the main pole and TRSKM has insufficient spatial resolution to separate the pole tip magnetization dynamics from any shield dynamics. Other tools have been developed to measure the dynamic write field of a recording head using a tunneling magnetoresistive read sensor. However the disadvantages of these and TRSKM are long test time and complicated set up. Also, neither of these techniques can be used for volume testing.

Figure 1:
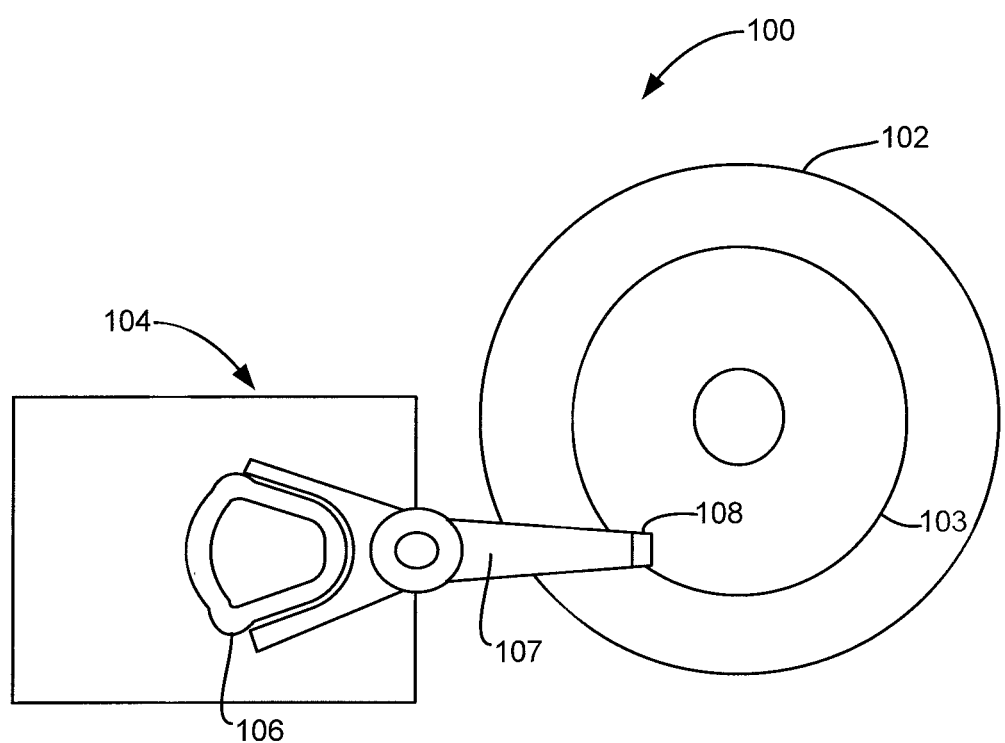
FIG. 1 is a schematic illustration of an exemplary spin stand testing system for testing a dynamic write field of a recording head according to an embodiment.

FIG. 1 is a schematic illustration of an exemplary spin stand testing system 100 for testing a dynamic write field of a recording head according to an embodiment. Spin stand testing system 100 includes a magnetic medium 102 and a positioning device 104. Magnetic medium 102 is representative of a magnetic disc that would be used in a data storage system and is configured to rotate about its central axis. Positioning device 104 includes an actuator 106 and a suspension 107 for supporting a test magnetic head 108. Test magnetic head 108 includes at least a recording head (writer). Actuator 106 is configured to position suspension 107 and therefore test magnetic head 108 to a desired position on a track 103 on magnetic medium 102.

To write information to a location on a magnetic medium, the recording head is moved over the specified location on magnetic medium while a magnetic field is generated via write coils. To generate the magnetic field, a write current ($I_w$) is applied to the write coils causing the magnetic field to be circulated through the magnetic medium and therefore storing information. The write current ($I_w$) is generally a series of square wave current pulses that arrive in the write coils of the writer at the moment when the magnetic head travels over a location on the magnetic medium to be written to. To cause faster writing, a higher frequency of current pulses and a faster rising current ($I_w$) should be employed.

To allow for a higher frequency writing, an overshoot current ($I_{OS}$) is added to the generated square wave to boost the magnetic field in the write head. The combination of the square wave current ($I_{SQ}$) and the overshoot current ($I_{OS}$) becomes the write current ($I_w = I_{SQ} + I_{OS}$). The overshoot current ($I_{OS}$) allows the current pulses to have a faster or shorter rise time (RT) so that a higher frequency write current can be used to write information with a write head so as to increase the recording data rate. Therefore, during the testing of dynamic write fields in recording heads using spin stand tester 100, the write current ($I_w$) also will be a combination of the square wave current ($I_{SQ}$) the overshoot current ($I_{OS}$).

Figure 2A:
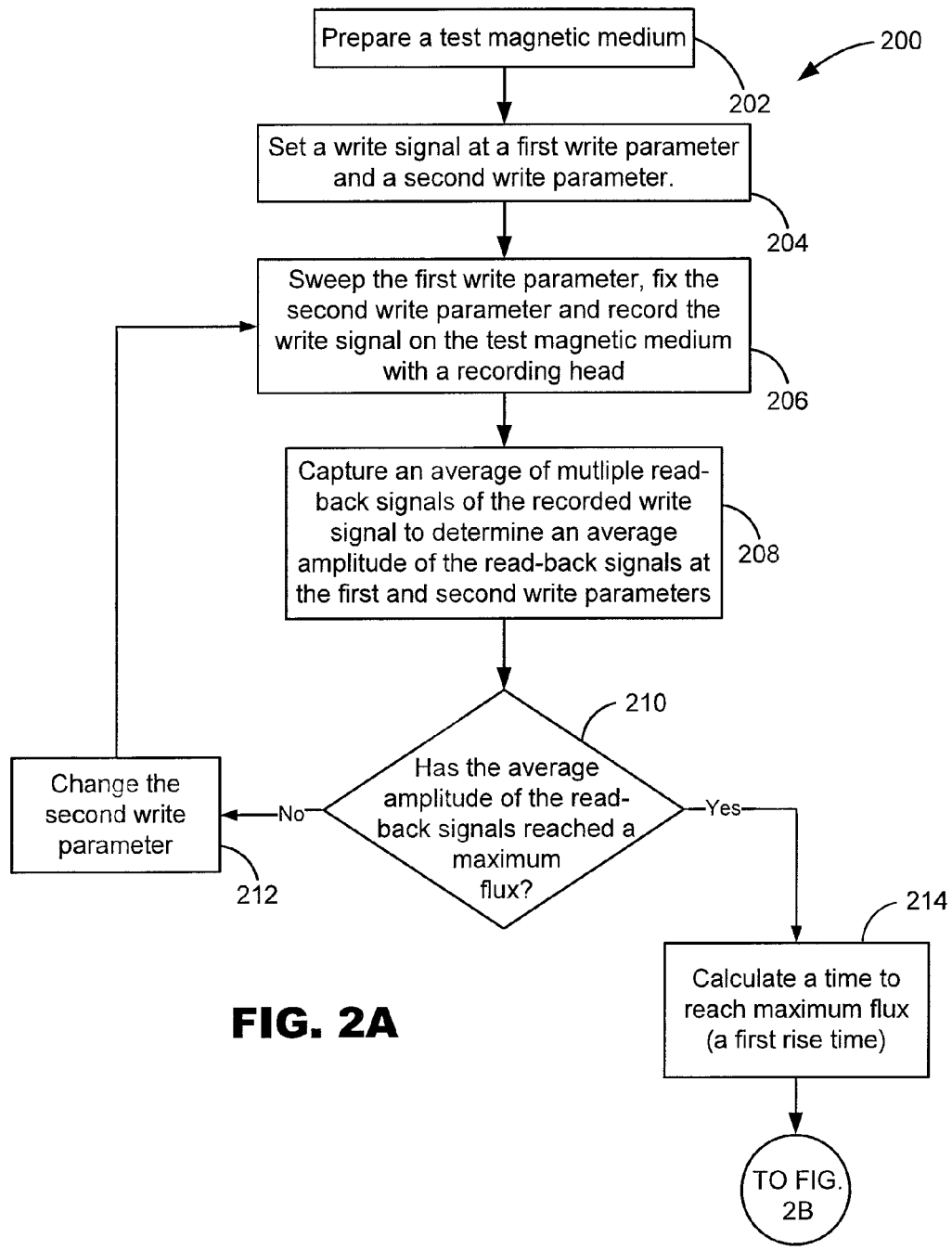
FIGS. 2A and 2B illustrate a method of testing a dynamic write field of a recording head according to an embodiment.
Figure 2B:
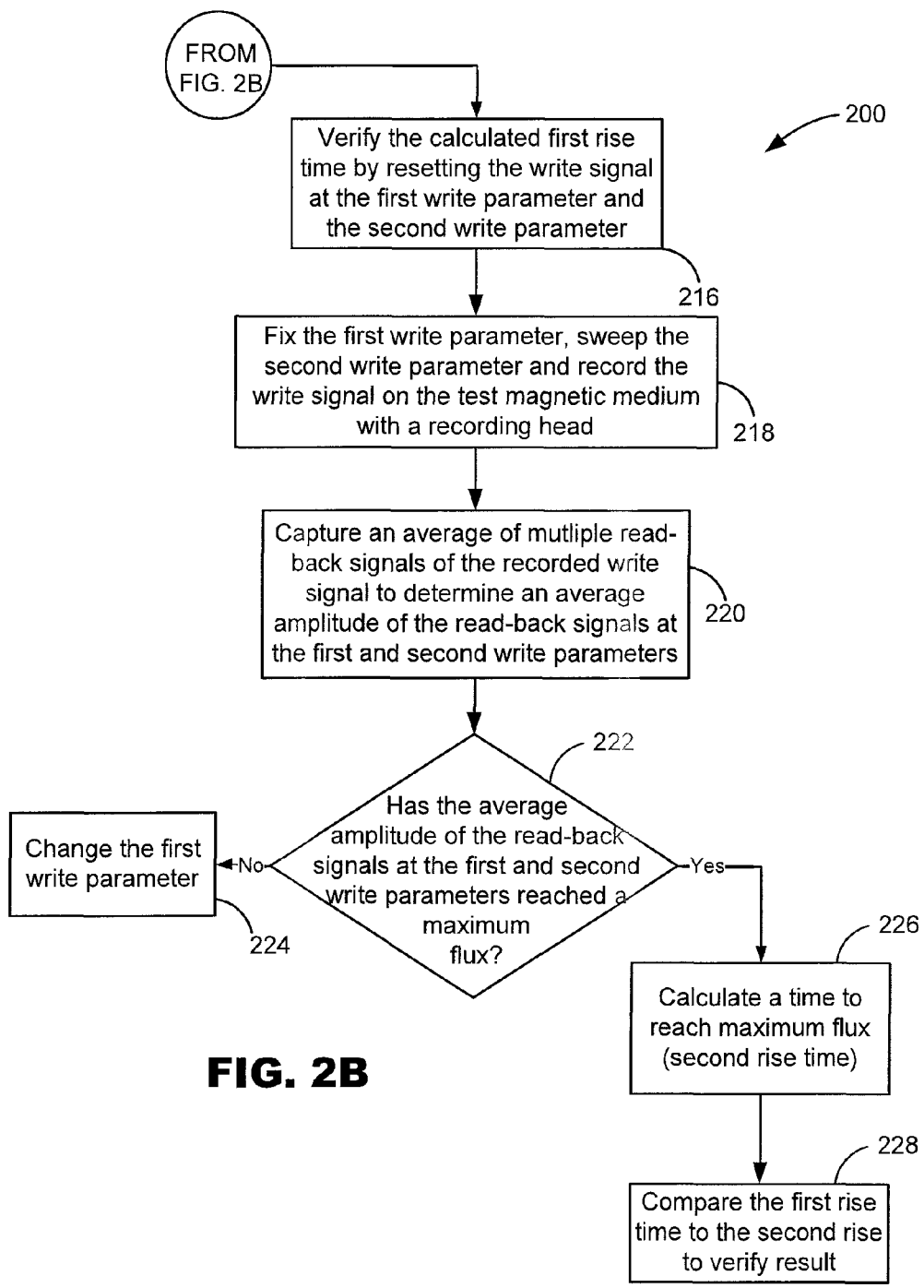

FIGS. 2A and 2B illustrate a method 200 of testing a dynamic write field of recording head 108 according to an embodiment. At block 202, test magnetic medium 102 is prepared so as to reduce noise and provide a better background on the medium. This is done by erasing what is on the medium 102 including AC band-erasing using high-frequency writing in order to avoid distortions created by perpendicular stray fields. Then the center of target track 107 is DC-erased. At block 204, a write signal that will be applied to the recording head is set at a first write parameter or condition and a second write parameter or condition. For example and under one embodiment, the first write parameter may be the pulse width of the write signal and the second write parameter may be the amplitude of the write current in the form of the overshoot amplitude (OSA) of the overshoot current ($I_{OS}$) portion of the write current ($I_w$). In the alternative, the first write parameter may be the OSA and the second write parameter may be the pulse width.

At block 206, the write signal sweeps the first write parameter, fixes the second write parameter and records the write signal to test magnetic medium 102 with recording head 108. For example, pulse width may be a first write parameter, while OSA may be a second write parameter. In the alternative, OSA may be the first write parameter, while pulse width may be the second write parameter. The write signal is recorded in a direction opposite the DC-erase that was employed in block 202 for preparation of test magnetic medium 102. At block 208, an average of multiple read-back signals of the recorded write signal are captured to determine an average amplitude of the read-back signals at the first and second write parameters. Under one embodiment, these read-back signals are captured with a digital oscilloscope from the track center.

At block 210, it is determined whether the average amplitude of the read-back signals at the first and second write parameters reach a maximum flux or in other words saturate. As discussed above, maximum flux or saturation is directly related to recording data rate. If maximum flux or saturation has not been reached, method 200 passes to block 212. If maximum flux or saturation has been reached, method 200 passes to block 214. At block 212, when maximum flux and saturation has not occurred, the second write parameter is changed and method 200 returns to block 206 for further testing.

At block 206, the write signal sweeps the first write parameter, fixes the second write parameter and records the write signal to the test magnetic medium 102 with recording head 108. An average of multiple read-back signals of the recorded write signal are captured at block 208 to determine an average amplitude of the read-back signals. At block 210, it is determined whether the average amplitude of the read-back signals at the first write parameter and the second write parameter have reached a maximum flux or saturated. Steps 206, 208, 210 and 212 are continuously repeated with the first write parameter, such as pulse width, being swept and the second write parameter, such as OSA, continuing to be changed to fixed values until maximum flux or saturation occurs. At block 214, a time to reach the maximum flux or saturation is calculated. This is the recording head's rise time or first rise time calculation. The time it take to perform the test shown in FIG. 2A is less than other known methods and in many instances may be less than one second.

Method 200 then passes to block 216, as illustrated in FIG. 2B, where the calculated rise time begins verification. This is done by resetting the write signal at the first write parameter or condition and at the second write parameter or condition. At block 218, the write signal fixes the first write parameter, sweeps the second write parameter and records the write signal on test magnetic medium 102 with recording head 108. An average of multiple read-back signals of the recorded write signal are captured at block 220 by, for example, the digital oscilloscope, to determine an average amplitude of the read-back signals at the first and second write parameters. At block 222, it is determined whether the average of the amplitude of the read-back signal at the first and second write parameters have reached a maximum flux or saturation. If not, this time, at block 224, the first write parameter is changed. Steps 218, 220, 222 and 224 are continuously repeated with the first write parameter, such as pulse width, continuing to be changed and the second write parameter, such as OSA, being fixed (and fixed at a high enough amplitude) until maximum flux or saturation occurs. At block 226, a time to reach the maximum flux or saturation is calculated. This is the recording head's rise time or second rise time calculation. Like the time it take to perform the verification test shown in FIG. 2A is less than other known methods and in many instances may be less than one second. At block 228, the first and second rise times are compared to verify that the first rise time calculation was accurate.

When the write parameter is a sweeping or changing pulse width, the investigation of the recording data rate of the recording head is particularly interesting. When the pulse duration or width is small, the head is switching the media in the fastest write pole region. As the pulse duration or width is increased, other pole regions are beginning to switch until a "steady state" magnetization is achieved. Read-back waveforms of read-back signals at the write pole center with varying pulse durations or widths and a normalized OSA actually mimic the magnetic field at the pole tip.

Figure 3A:
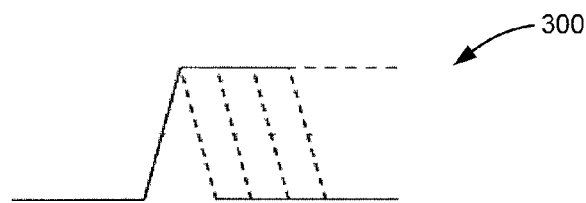
FIG. 3A is a schematic illustration of pulses in an exemplary write signal.
Figure 3B:
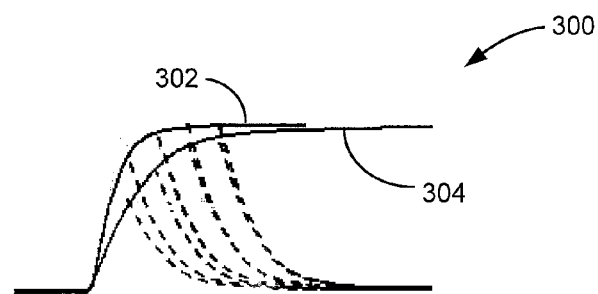
FIG. 3B is the schematic illustration of FIG. 3A with behaviors of writer pole fields of a first recording head design and a second recording head design.

FIG. 3A is a schematic illustration 300 of pulses in an exemplary write signal. In particular, FIG. 3A illustrates four pulses in an exemplary write signal. FIG. 3B is the schematic illustration 300 of FIG. 3A, but with behaviors of writer pole fields of a first recording head design 302 and a second recording head design 304 when the method of testing fixes OSA and sets current high enough, while sweeps the pulse width. As illustrated in FIG. 3B, first recording head design 302 has a faster rise time than second recording head design 304. In particular, first design 302 saturates at approximately the third pulse, while second design 304 saturates at approximately the fourth pulse.

Figure 4:
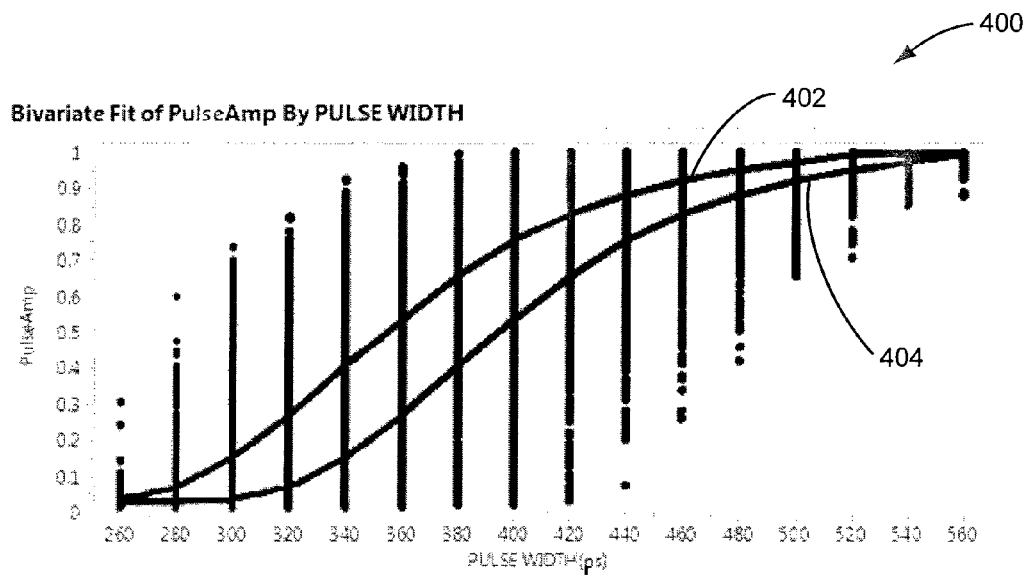
FIG. 4 illustrates a graphical representation of pulse amplitude versus pulse width as applied to the testing of two different recording head designs.

FIG. 4 illustrates a graphical representation 400 of pulse amplitude versus pulse width as applied to the testing of a first recording head design 402 and a second recording head design 404. In this test method, OSA is fixed and set at a current high enough while the pulse width is swept. As illustrated, first recording head design 402 saturates faster than second recording head design 404. This means that first recording head design 402 has a faster recording data rate than second recording head design 404 and therefore when designing a magnetic head for fastest recording time, the first recording head design 402 should be used.

Figure 5:
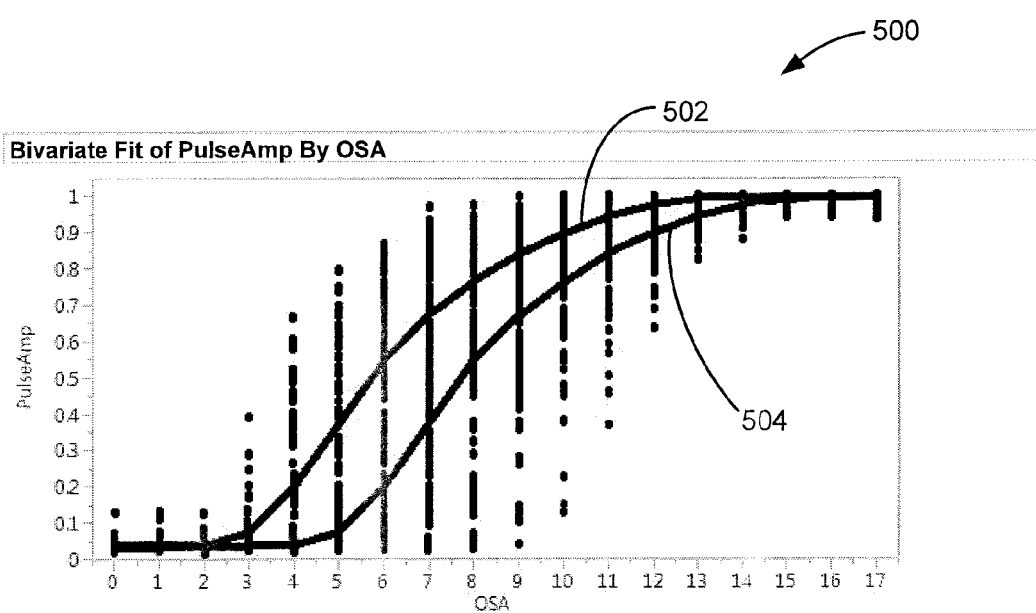
FIG. 5 illustrates a graphical representation 500 of pulse amplitude versus overshoot amplitude (OSA) of the write current as applied to the testing of two different recording head designs.

FIG. 5 illustrates a graphical representation 500 of pulse amplitude versus OSA of the write current as applied to the testing of a first recording head design 502 and a second recording head design 504. In this test method, pulse width is fixed while OSA is swept. When OSA is at a low condition, the write pole magnetic field is weak and there is no write signal recorded on the magnetic medium. As the OSA increases, the magnetic field at the write pole tip becomes stronger and stronger and the write signal begins to record on the medium. When OSA is strong enough, the write pole tip will switch to a "steady state" magnetization. As shown in FIG. 5, first recording head design 502 is faster than second recording head design 504. First recording head design 502 uses less OSA to achieve a "steady state" magnetization.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments and can be used to solve other problems of similar nature. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of testing a dynamic write field of a recording head, the method comprising:
   preparing a test magnetic medium;
   recording a write signal on the test magnetic medium with the write signal being set at a first write parameter and a second write parameter;
   capturing an average of multiple read-back signals of the recorded write signal to determine an average amplitude of the read-back signals, wherein the average amplitude of the read-back signals is related to write current; and
   repeating the recording of the write signal on the test magnetic medium and the capturing of the average of multiple read-back signals of the recorded write signal to determine the average amplitude of the read-back signals by fixing the first write parameter of the write signal and changing the second write parameter of the write signal until the average amplitude of the read-back signals saturates.

2. The method of claim 1, further comprising calculating a rise time of the write signal based on when the average amplitude of the read-back signals saturate, wherein the rise time is comprises a first rise time.

3. The method of claim 2, further comprising verifying the calculated first rise time of the write signal by resetting the write signal to the first write parameter and the second write parameter and performing the steps of:
   recording a verification write signal on the test magnetic medium with the verification write signal being set at the first write parameter and the second write parameter;
   capturing an average of multiple read-back signals of the recorded verification write signal to determine an average amplitude of the read-back signals, wherein the average amplitude of the read-back signals is related to write current; and
   repeating the recording of the verification write signal on the test magnetic medium and the capturing of the average of multiple read-back signals of the recorded write signal to determine the average amplitude of the read-back signals by changing the first write parameter of the write signal and fixing the second write parameter of the write signal until the average amplitude of the read-back signals saturates.

4. The method of claim 3, further comprising calculating a verification rise time of the verification write signal based on when the average amplitude of the read-back signals saturate, wherein the verification rise time comprises a second rise time.

5. The method of claim 4, further comprising comparing the first rise time to the second rise time to verify accuracy of the first rise time.

6. The method of claim 1, wherein the first write parameter of the write signal comprises one of a pulse width and an amplitude of the write current.

7. The method of claim 6, wherein the second write parameter of the write signal is different from the first write parameter and comprises one of the pulse width and the amplitude of the write current.

8. The method of claim 7, wherein the amplitude of the write current comprises an overshoot amplitude of the write current.

9. A method of testing a dynamic write field of a recording head, the method comprising:
   preparing a test magnetic medium;
   recording a write signal on the test magnetic medium with the write signal being set at an amplitude of a write current and a pulse width;
   capturing an average of multiple read-back signals of the recorded write signal to determine an average amplitude of the read-back signals, wherein the average amplitude of the read-back signals is related to write current; and
   repeating the recording of the write signal on the test magnetic medium and the capturing of the average of multiple read-back signals of the recorded write signal to determine the average amplitude of the read-back signals by fixing the amplitude of the write current and changing the pulse width of the write signal until the average amplitude of the read-back signals saturates.

10. The method of claim 9, further comprising calculating a rise time of the write signal based on when the average amplitude of the read-back signals saturate, wherein the rise time is comprises a first rise time.

11. The method of claim 10, further comprising verifying the calculated first rise time of the write signal by resetting the amplitude of the write current and the pulse width of the write signal and performing the steps of:

recording a verification write signal on the test magnetic medium with the verification write signal being set at the amplitude of the write current and the pulse width;

capturing an average of multiple read-back signals of the recorded verification write signal to determine an average amplitude of the read-back signals at the amplitude of the write signal and the pulse width of the write signal, wherein the average amplitude of the read-back signals is related to write current; and repeating the recording of the verification write signal on the test magnetic medium and the capturing of the average of multiple read-back signals of the recorded write signal to determine the average amplitude of the read-back signals by changing the amplitude of the write current and fixing the pulse width of the write signal until the average amplitude of the read-back signals saturates.

12. The method of claim 11, further comprising calculating a verification rise time of the verification write signal based on when the average amplitude of the read-back signals saturate, wherein the verification rise time comprises a second rise time.

13. The method of claim 12, further comprising comparing the first rise time to the second rise time to verify accuracy of the first rise time.

14. The method of claim 9, wherein the amplitude of the write current comprises an overshoe amplitude of the write current.

15. A method of testing a dynamic write field of a recording head, the method comprising:

preparing a test magnetic medium;

recording a write signal on the test magnetic medium with the write signal being set at a pulse width and an amplitude of a write current;

capturing an average of multiple read-back signals of the recorded write signal to determine an average amplitude of the read-back signals, wherein the average amplitude of the read-back signals is related to write current; and repeating the recording of the write signal on the test magnetic medium and the capturing of the average of multiple read-back signals of the recorded write signal to determine the average amplitude of the read-back signals by fixing the pulse width of the write signal and changing the amplitude of the write current until the average amplitude of the read-back signals saturates.

16. The method of claim 15, further comprising calculating a rise time of the write signal based on when the average amplitude of the read-back signals saturate, wherein the rise time is comprises a first rise time.

17. The method of claim 16, further comprising verifying the calculated first rise time of the write signal by resetting the pulse width of the write signal and the amplitude of the write current and performing the steps of:

recording a verification write signal on the test magnetic medium with the verification write signal being set at the pulse width and the amplitude of the write current;

capturing an average of multiple read-back signals of the recorded verification write signal to determine an average amplitude of the read-back signals, wherein the average amplitude of the read-back signals is related to write current; and repeating the recording of the verification write signal on the test magnetic medium and the capturing of the average of multiple read-back signals of the recorded write signal to determine the average amplitude of the read-hack signals by changing the pulse width of the write signal and fixing the amplitude of the write current until the average amplitude of the read-back signals saturates.

18. The method of claim 17, further comprising calculating a verification rise time of the verification write signal based on when the average amplitude of the read-back signals saturate, wherein the verification rise time comprises a second rise time.

19. The method of claim 18, further comprising comparing the first rise time to the second rise time to verify accuracy of the first rise time.

20. The method of claim 15, wherein the amplitude of the write current comprises an overshoot amplitude of the write current.

* * * * *